Oct. 13, 1953     E. Y. SHARLIP ET AL     2,654,911
AUTOMATIC MOLD CLEANING MACHINE
Filed Dec. 17, 1948     5 Sheets-Sheet 1
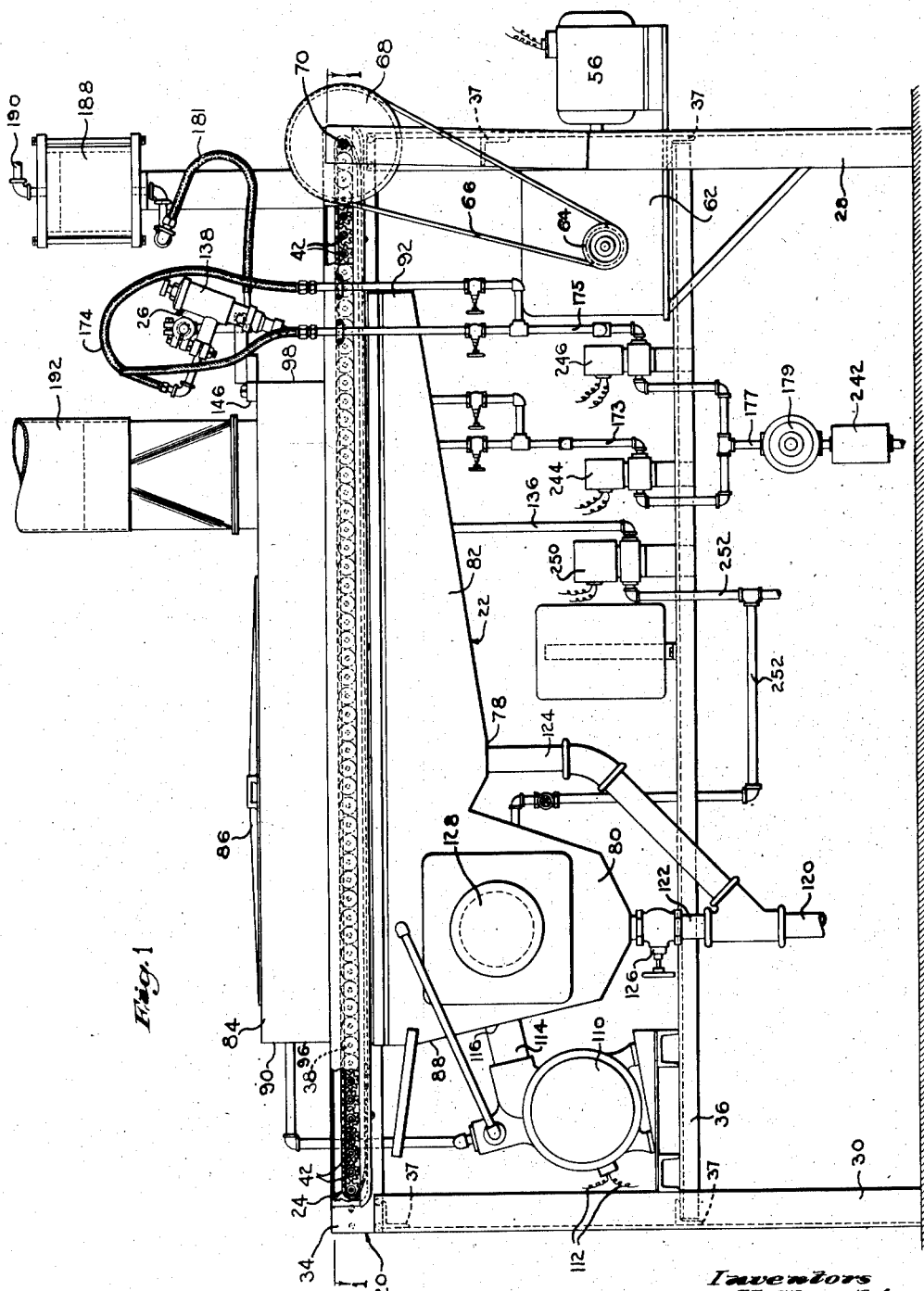
Inventors
Edgar Y. Sharlip
Alvin P. Dunbrack
by H. Hume Mathews
Attorney

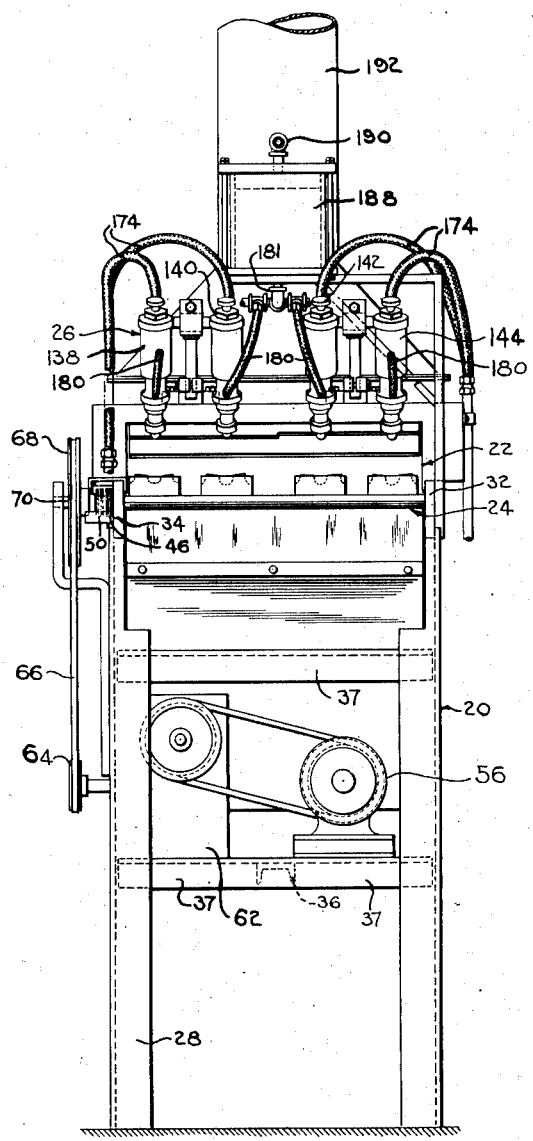
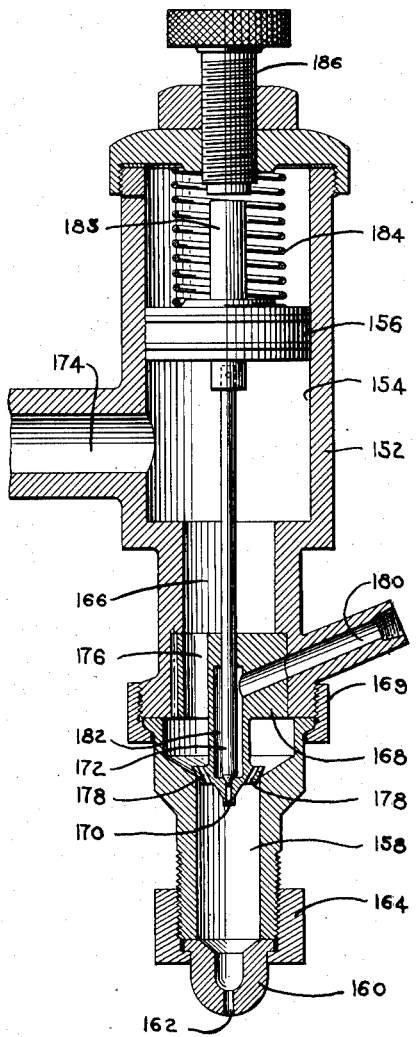

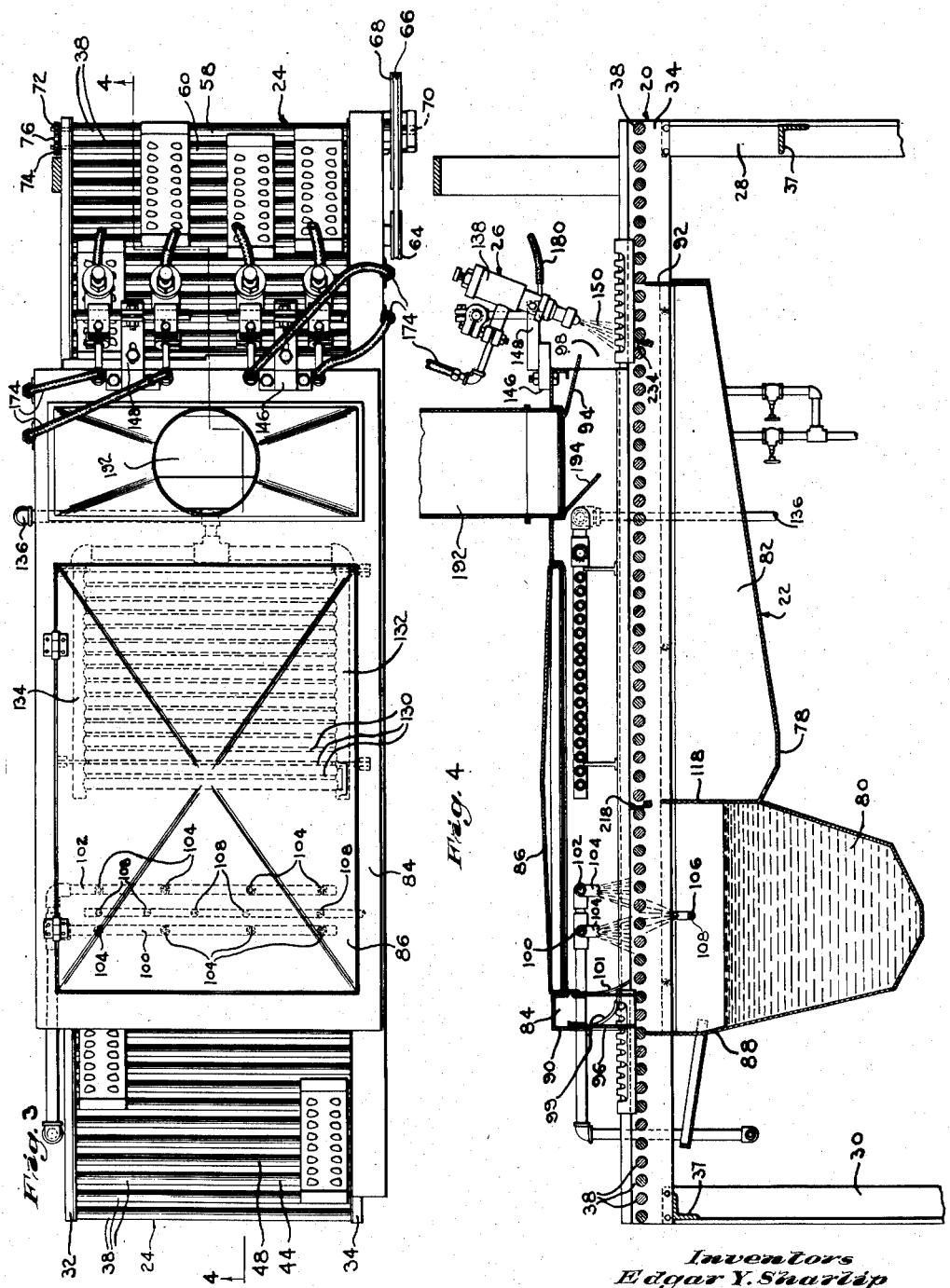

Oct. 13, 1953    E. Y. SHARLIP ET AL    2,654,911
AUTOMATIC MOLD CLEANING MACHINE
Filed Dec. 17, 1948    5 Sheets-Sheet 4
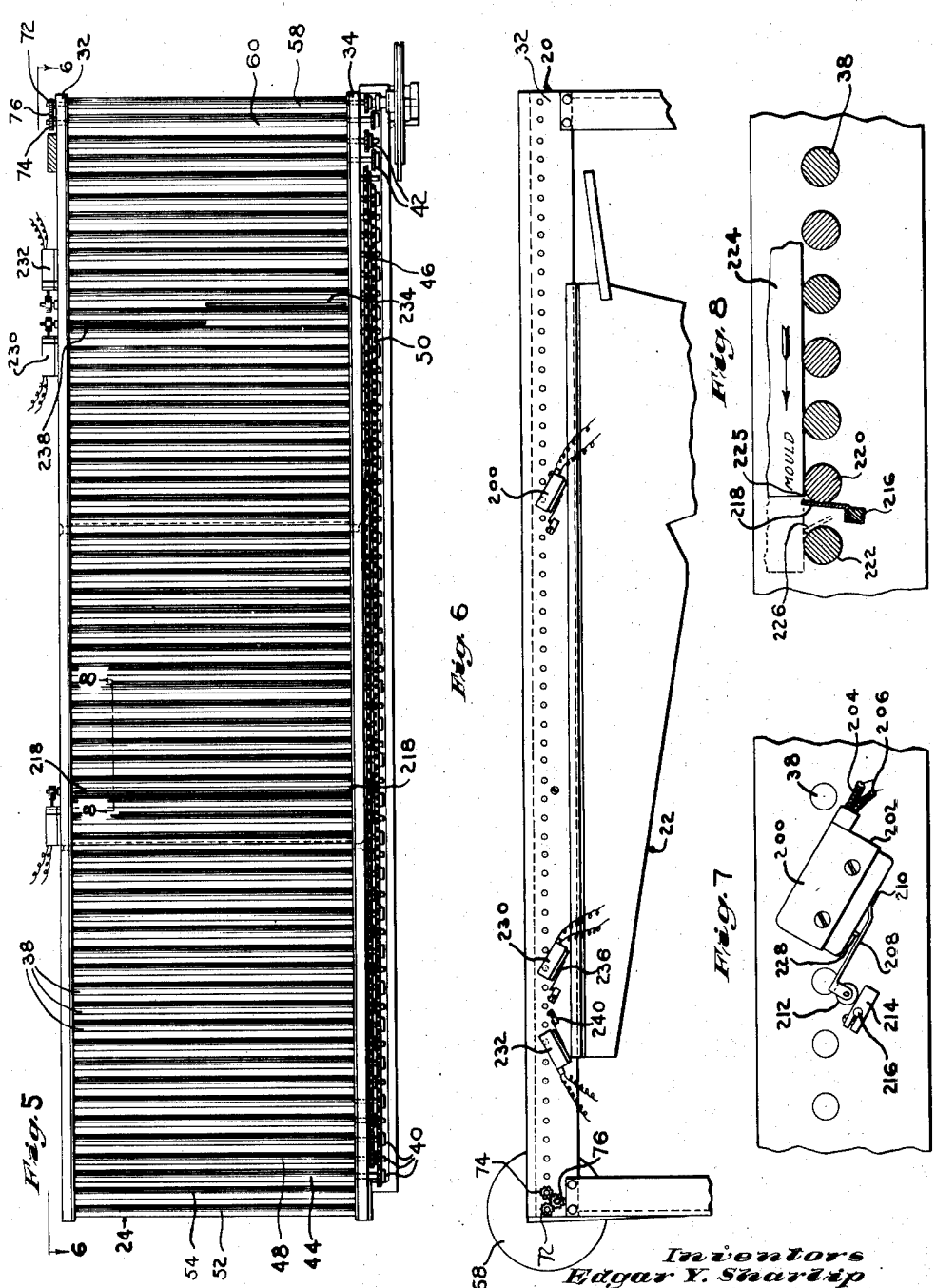
Inventors
Edgar Y. Sharlip
Alvin P. Dimmock
by Hume Mathews
Attorney

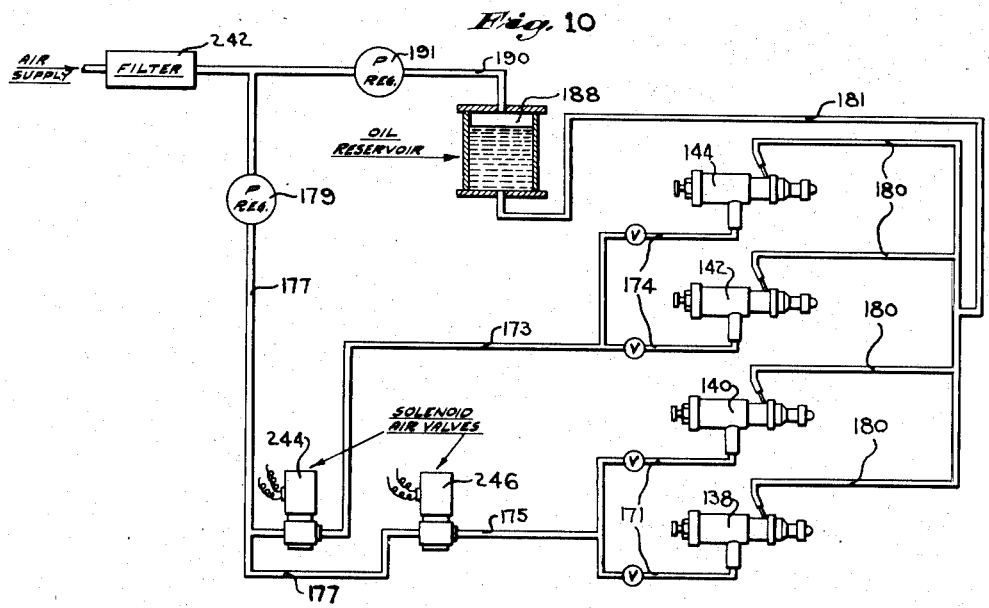
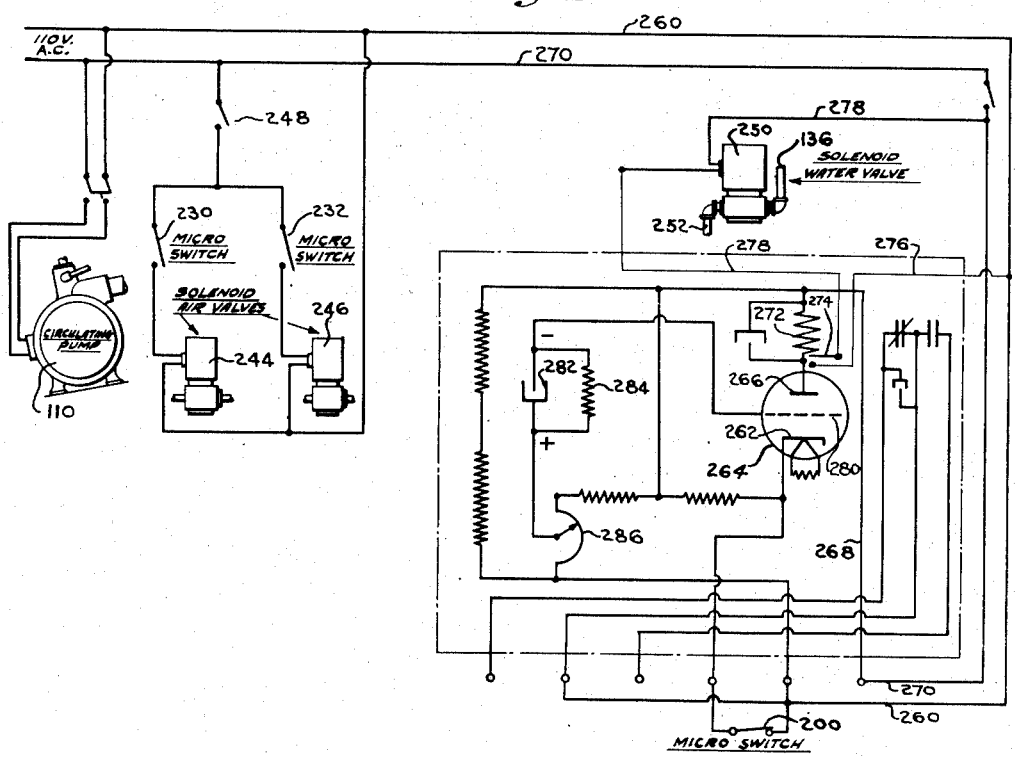

Patented Oct. 13, 1953

2,654,911

UNITED STATES PATENT OFFICE 2,654,911

AUTOMATIC MOLD CLEANING MACHINE

Edgar Y. Sharlip, Philadelphia, and Alvin P. Dunbrack, Springfield, Pa., assignors to The Dentists' Supply Company of New York, New York, N. Y., a corporation of New York Application December 17, 1948, Serial No. 65,834

5 Claims. (Cl. 118—2)

This invention relates to mold cleaning machines, and particularly to an automatic machine for cleaning the molds used in the manufacture of artificial teeth.

In the manufacture of porcelain teeth it is common practice to first form a veneer or shell tooth portion of a pigmented or unpigmented porcelain paste having visual characteristics when fired simulating the enamel part of a natural tooth, and then to mold thereon or thereto a body portion of a differently pigmented porcelain paste having visual characteristics when fired simulating the dentine part of a natural tooth. The molding process and apparatus may be that shown and described in the Clapp Patent 1,547,643 issued July 28, 1925. Three mold parts are used. Two of these, the face mold part and the shader mold part, when assembled with enamel porcelain paste in the cavities therebetween act to compress and shape said paste into forms representing enamel portions of natural teeth. Heat is applied to the mold parts during the compression process to harden the binder in the porcelain paste sufficiently to enable the compressed and shaped paste to retain the form imparted thereto by the surfaces of the mold cavities. The shader mold part is then removed (the pressed or biscuited enamel portions remaining in the face mold part), body porcelain paste is added to the cavities and then the back mold part is assembled with the face mold part and the mold is again compressed and heated. This second compression and heating operation shapes the previously biscuited enamel paste and the added body paste into integral masses having shapes corresponding to those of the finished teeth, but slightly oversize with respect thereto by an amount equal to the shrinkage that occurs in firing. These biscuited teeth are then fired by subjecting them to a relatively high accurately controlled temperature, sufficient to fuse or vitrify the porcelain material of each biscuit into a hard glossy artificial tooth which simulates a natural tooth.

The porcelain paste used in this manufacturing process must harden and coalesce sufficiently when heated to form tooth biscuits which will retain their form until and during the firing operation. At the same time, the biscuited teeth must "deliver" easily, or be readily removable from their cavities, yet the enamel or veneer biscuit portions should remain in the cavities of the face mold part when the shader mold part is removed. At all times foreign matter such as dirt and particles of previously molded tooth biscuits or paste must be excluded from the fresh porcelain paste and from the molding surfaces of the mold, because such foreign substances if incorporated in the fresh paste are likely to cause "specks" or defects and blemishes in the completed or fired tooth.

It was known prior to this invention that these requirements could be met to some extent (assuming other factors such as mold design and the composition of the porcelain paste are correct) by washing and rinsing the molds and then coating their molding surfaces with a thin film of oil, such as lard oil, subsequent to one biscuiting operation and prior to the next. This was done by placing the various mold parts to be washed in a sieve-like tray and then immersing the tray in washing solution and agitating it by hand until the mold parts were deemed sufficiently clean. The tray was then immersed or dunked in a rinsing bath after which the mold parts were taken from the tray and kept in the open atmosphere until they dried. After drying the molding surfaces were brushed with an oil soaked brush to form a thin coating or film of oil thereon.

However, this hand mold cleaning process requires a considerable amount of individual labor, is time consuming, and the molds are subjected to much handling with consequent risk of damage. Also, and perhaps most important of all, there is opportunity for foreign matter to settle on or stick to the molding surfaces or to be entrained in the oil film thereon, particularly during the periods while the mold is drying in the atmosphere and during the brushing or oil coating step. In fact, the application of oil with a brush is itself conducive to the entraining of dirt or foreign matter in the oil film because the brush is used over and over again and tends to pick up dirt or particles of foreign matter.

According to the present invention all these disadvantages of the old hand process of cleaning tooth molds may be obviated, yet the work may be done more quickly and efficiently, more uniformly or consistently, and at lower cost. At the same time a more thorough cleaning and oiling job is accomplished and far less opportunity is offered for foreign matter or dust to settle on the molding surfaces or to be entrained in the oil film. The various mold parts may be washed, rinsed, dried and oiled as before, thereby enabling the invention to be used with present porcelain tooth biscuiting processes and apparatus with little or no change in the process or apparatus, apart from the substitution of the automatic mold cleaner of the present invention for the hand work as formerly practiced. But the process and apparatus of the present invention enables these cleaning and oiling steps to be done automatically and at the same time more thoroughly and efficiently. Furthermore, the mold parts are simultaneously dried and oiled by automatically operating means immediately after they are rinsed, and while they are still wet from the washing and rinsing operations. Thus, the entry of foreign matter or specks into the porcelain tooth biscuits may be substantially reduced, considerably decreasing the percentage of defective teeth in the total number of teeth biscuited and fired.

Other objects and advantages of the invention will be apparent from the accompanying drawings and the following description of a presently preferred embodiment of the invention, in which:

Figure 1 is a side elevational view of an automatic tooth mold cleaning and coating machine constructed in accordance with the teaching of the present invention.

Figure 2 is an end elevational view of the machine of Figure 1.

Figure 3 is a top view of the machine of Figure 1.

Figure 4 is a longitudinal cross-sectional view taken along the lines 4—4 in Figure 3.

Figure 5 is a top view of the roller conveyor and the drive means therefor, of the machine of Figure 1.

Figure 6 is a side view, partly broken away, along the lines 6—6 of Figure 5.

Figure 7 is an enlarged partial side view of the microswitches.

Figure 8 is an enlarged partial sectional view of the microswitch actuating bar, along the line 8—8 of Figure 5.

Figure 9 is an enlarged cross-sectional view of the mold drying and mold coating spray mechanism.

Figure 10 is a diagrammatic view of the pneumatic and hydraulic system for the drying and coating spray mechanism.

Figure 11 is a diagrammatic view of the electrical circuits for controlling the operation of the washing spray, the rinsing spray, and the drying and coating spray.

The machine shown in the drawing comprises a frame 20 supporting a mold washing and rinsing chamber 22 through which molds or mold parts are moved by a conveyor 24 to the drying and oiling spray apparatus 26.

Frame 20 has four legs, two of which are shown at 28 and 30, to which a pair of parallel upper beams 32, 34 and a lower beam, shown at 36, are welded or bolted. Cross beams, as shown at 37 are provided in sufficient number to afford a rigid frame structure and offer appropriate support for the working parts. The beams and the legs may be constructed of any readily available structural shape, such as plates and angle iron.

Conveyor 24 consists of a series of cylindrical rollers 38 rotatably mounted on very close centers in bearings (not shown) in the upper parallel beams at the opposite ends of the rolls. These rollers extend transversely with respect to the longitudinal axis of the machine and with respect to the direction of motion of the mold parts conveyed thereby. At one end each roll is provided with a stub shaft projecting through the respective roll bearing, as shown at 40. A sprocket 42 is fixed to each stub shaft, and these sprockets are staggered, or alternate sprockets are offset, so that the sprockets of every other roll starting with the first driven roll 44 are aligned to form a first line of sprockets interconnected by the chain-belt 50, while the sprockets of every other roll beginning with the second driven roll 48 are aligned to form a seecond line of sprockets interconnected by the chain-belt 46. Two idler rolls 52, 54 are provided at the entrance end of the conveyor but all the other rolls are power driven by the conveyor drive motor 56 and the chain belts 46 and 50. Power from the motor is fed to the two end rollers 58, 60 through a reduction gear box 62 and a belt and pulley drive 64, 66, 68. Driven pulley 68 is fixed to an extension shaft 70 on the end roll 58, thereby driving that roll and all the other alternate rolls which are connected thereto by chain 46. Roll 58 carries at its other end a gear 72 which is connected to a like gear 74 on the roll 60 through the idler gear 76, thereby driving roll 60 and all the other alternate rolls which are connected thereto by chain 50. The arrangement is such that the rolls 58 and 60 are rotated in the same direction and at the same speed, and therefore all the other rolls (except the two idler rolls 52, 54) will also be rotated in the same direction and at the same speed, though by the two separate chain drives 46, 50. The axes of the rollers are all parallel, lying in the same plane, and the rolls are of equal diameters. Consequently they cooperate to form in effect a flat conveyor which will move a mold part placed thereon smoothly and at a uniform speed determined by the speed of the motor 56 from the entrance rollers 44, 48 past the exit rollers 58, 60. While the speed at which the mold parts are conveyed is uniform and the driving force is ample to prevent slippage under normal conditions, in the event some stoppage or obstruction occurs to the progress of any one or group of mold parts, no damage will be done. The roller surfaces will merely slip relative to the mold surfaces under such conditions, because the driving force is transmitted from the rollers to the molds only by friction between their contacting surfaces. Furthermore, though the mold parts are adequately supported at all times for smooth and even movement by a plurality of the closely spaced rollers, their bottom surfaces are accessible through the spaces between the rollers and may be completely cleaned by sprays which are directed upwardly between the rollers onto the bottom mold surfaces as they move along the conveyor.

Over the greater part of its length conveyor 24 is enclosed by the washing chamber or tank 22, which consists of a sump portion 78, having separate wells 80, 82 beneath the conveyor, and a cover portion 84. A lid 86 in the cover may be lifted to permit ready access to the interior of the chamber. Cover 84 extends over the entire width of the sump 78 and over all its length with the exception of that portion underlying the drying and oiling apparatus 26. The cover and sump portions may be connected along their side edges to the sides of the frame 20, to provide a substantially fluid tight enclosure or envelope extending completely around the conveyor. The front and rear ends of this enclosure are also closed, by the end walls 88, 90 and 92, 94, except for the entrance opening 96 and the exit opening 98. These openings extend across the full width of the conveyor but are of relatively low height. Furthermore, the entrance opening is substantially closed by a pair of spaced parallel walls 99, 101 of flexible material, such as leather, which normally fill or bridge the entrance opening and prevent ingress or egress of any appreciable amount of air or water to or from the chamber, but which are readily deflected or distorted by a mold part moving along the conveyor to permit its unobstructed movement into the chamber. The exit opening 98 is left uncovered for reasons which will later appear.

As a mold part moves along the conveyor through the chamber it is subjected to the action of three different sprays which respectively washes it with water containing a detergent, rinses it with clean water and drys and oils it with a combined air and oil spray.

The washing spray is located adjacent the entrance end of the chamber. It comprises a pair of top spray pipes 100, 102 containing a plurality of spray openings or nozzles 104 and a bottom spray pipe 106 also containing a plurality of spray openings and nozzles 108. Both the top and bottom nozzles of the washing spray are supplied with a washing fluid under pressure by a centrifugal pump 110 driven by an electric motor (not shown) energized through the leads 112. Well 80 of sump 78 is located directly beneath the washing spray and receives practically all of the used cleaning fluid from said spray as it flows and drips from the surfaces of the mold parts being cleaned. This well is made relatively deep so as to contain a large quantity of cleaning fluid and to provide ample space at the bottom thereof for the settlement of dirt particles, etc. removed from the mold parts by the washing fluid. Because a large quantity of cleaning fluid is so provided it is practicable to re-use it or re-circulate it over and over again so that a large quantity of molds can be cleaned with the same cleansing fluid without having it become unduly contaminated. The re-circulating feed to the inlet of the centrifugal pump is taken through an inlet pipe 114 which connects with the well 80 at a point 116 located a considerable distance above the bottom wall surface of the well. Thus foreign matter and dirt particles, which naturally fall because of their higher specific gravity to the bottom of the well, are not picked up and re-circulated through the pump inlet. This inherent filtering action provided by the relatively great depth of the well 80 is enhanced by the fact that the pump inlet 114 is taken from the side of the well adjacent the entrance end of the conveyor. The mold parts move continuously in a direction away from the front end wall 88 of the chamber and therefore used cleaning fluid and dirt particles from the mold surfaces tend to fall more toward the rear wall 118 of the well and away from the front wall, thus keeping them away from the centrifugal pump inlet at the opening 116. A drain pipe 120 having separate branches 122, 124 respectively connecting with the wells 80 and 82 is provided for draining said wells. The branch 124 is continuously open so that well 82 is continuously empty. However, because it is desirable to maintain a reservoir of cleaning fluid in the well 80 which can be re-used continuously, the drain branch 122 is provided with a valve 126 which is normally kept closed but which can be opened to drain the well 80 at such times as it may be desired to refill or provide replacement cleaning fluid in the well 80. An access door 128 is provided in the side wall of well 80 to facilitate cleaning and repair of the interior of the apparatus.

The washing and scrubbing action of the spray nozzles 104, 108 combines the chemical action of the detergent liquid in the well 80 (for instance a strong solution of soap and water can be used) with the mechanical scrubbing or scouring action of the high velocity sprays projected from the nozzle openings. Pump 110 is preferably of the centrifugal type and is selected or designed to move a relatively large volume of water at a relatively high pressure head so that the individual liquid streams issue from the nozzles at a high velocity sufficient to mechanically break away and dislodge any particles of dirt or mold material adhering to the surfaces of the mold. The spray nozzles or openings are so located and are designed with a sufficiently high angle of dispersion so that the sprays when considered together extend completely across the width of the conveyor and act to blanket any and all surfaces, both top and bottom, of a mold part or parts passing through the chamber with high velocity streams of detergent liquid regardless of the location of the moving part transversely with respect to the chamber. Thus, when a mold part is placed on the roller conveyor its top and bottom surfaces will be completely mechanically and chemically washed as it passes between the opposed upper and lower spray nozzles regardless of its lateral position on the conveyor. Furthermore, the sprays diverge to some extent toward the front and rear of the washing chamber as well as laterally thereof and thus act to clean the upstanding or vertical front, rear and side surfaces of the mold part as well as the top and bottom surfaces thereof.

After the mold part leaves the washing spray it passes under a series of downwardly projected rinsing sprays formed by a plurality of openings or nozzles in the parallel pipes 130. These pipes extend across substantially the full width of the conveyor and are arranged between and are fed by a pair of longitudinally headers 132, 134 supplied from a single main 136. While no bottom rinsing spray is provided in the embodiment of the invention shown in the drawing, it will be understood that such a spray could be used if desired. Ordinarily it is sufficient merely to thorough flush the part with the top spray only from the pipes 132; such water is supplied in considerable volume and flows from the top surfaces down over the sides and to a considerable extent over the bottom surface of the part as well. For the rinsing spray where a large quantity of clean water at a relatively low pressure is desired, city water under city main or faucet pressure is supplied to the rinsing spray inlet pipe 136. The waste rinse water flows down between the rollers into the well 82 and thence is discharged through the drain 124, 120.

The mold part leaving the rinsing spray is completely clean both of dirt, used or excess molding material and washing fluid, but it is still wet with the rinsing water and a considerable quantity of such water is retained in the depressions and molding cavities of its upper surface. Particularly in the manufacture of a relatively fine or high quality product such as a porcelain tooth it is necessary to remove this water, dry the mold and to coat the molding surfaces with a thin film or coating of a liquid such as lard oil. These steps are done simultaneously in the machine shown in the drawing by the drying and coating spray apparatus 26, as the mold part passes thereunder. This process of simultaneously drying and oiling the rinsed, still wet molding surfaces is of especial importance for tooth molds used in the manufacture of porcelain artificial teeth because with such molds it is essential that no specks or particles of foreign matter be permitted to fall on the molding surfaces or cavities or entrained in the oil film thereon. To do so would probably cause a blemish in the molded and fired tooth resulting in rejection thereof as failing to pass inspection standards.

The drying and oiling apparatus comprises a series of modified spray guns, 138, 140, 142, 144 spaced transversely of the conveyor and supported by the brackets 146, 148 at an acute angle to the perpendicular so that the sprays 150 thereof are directed toward and partially into the exit opening 98 of the chamber. Each spray gun (see Figure 9) comprises a casing 152 having at one end a cylinder 154 containing a piston 156 and at the other end a mixing chamber 158 terminating in a nozzle or spray cap 160 having a spray port 162. The nozzle is retained on the casing by a screw threaded cap 164. Intermediate the cylinder 154 and the mixing chamber 158 is a valve chamber 166 containing a valve body 168 (to which access may be had by the screw-thimble connection 169) having an oil discharge port 170 controlled by a needle valve 172. Air admitted to the cylinder 154 through the passage 174 is by-passed around the valve body by ports 176, 178 to the spray port. Oil is admitted to the casing through the passage 180 and from there flows through the cylindrical space 182 to the valve port 170, assuming the needle valve 172 is lifted from its seat, or open. The needle valve is attached to the piston 156 which is normally biased downwardly by a compression spring 184. The arrangement is such that when air is not being supplied to the gun spring 184 will hold needle valve 172 closed so that neither oil nor air will issue from the spray port 162 and consequently the gun is inoperative. But when air is admitted under pressure to the gun through the passage 174 the resulting increase in air pressure in the cylinder 154 causes the piston 156 to rise against the force of spring 184 until the abutment 185 hits the adjustment screw 186, thereby opening the port 170, and allowing oil as well as air to flow in the mixing chamber 158 and thence through the spray port 162. The gun is preferably supplied with dry air under a steady high pressure from any convenient source of compressed air. Lard oil is supplied to the gun from the oil reservoir 188, which contains a quantity of such oil maintained under approximately the same or a higher pressure than the pressure of the air supplied through the passage 174. This pressure may conveniently be applied to the oil by admitting compressed air from the air supply source to the top of the oil reservoir through a conduit 190. The inlet oil pressure and the inlet air pressure are preferably maintained substantially constant relative to each other, by pressure regulating valves such as shown at 191, 179 in Figure 10. The rate of air flow to the spray is substantially constant, once the inlet pressure is properly adjusted. The rate of oil flow may be easily adjusted, either during operation or otherwise, by the screw 186, which determines the maximum spacing of needle valve 172 from its seat. This adjustment is preferably such that a relatively large quantity of air flowing through the by-pass ports 178 into the mixing chamber 158 will pick up or entrain a relatively small quantity of oil issuing from the valve port 170. Unlike a conventional spray gun, the mixing chamber 158 is formed so that the oil will not be fully atomized by the air stream but will be only partially broken up or atomized, or uniformly mixed with the air as evenly distributed droplets. The mixing chamber is of relatively large diameter and length (its length being about two and one-half times its diameter in the embodiment of the drawing) and the air passages 174, 166, 178 and the spray port 162 are all very large in relation to the size of the oil port 170. The design is such that the mixing chamber and spray port coact to project the air and oil out of the spray tip 160 through the spray port 162 as a flat fan shaped spray 150 consisting of a high velocity air stream containing small particles of partially atomized oil. It has been found that such a spray of high velocity air containing only partially atomized oil will simultaneously remove the water from the surfaces of the mold parts, dry the surfaces and replace said water with a thin uniform coating of oil. Thus the molds are dried and oiled at the same time and in a single operation and there is no lapse of time between the drying and oiling operation during which dirt or specks or foreign matter might collect on the mold surfaces.

Because the combined air and oil spray 150 is directed toward and into the exit opening 98 of the chamber and because the well 82 extends beyond or underneath said spray, the air from the spray and the water blown off the mold surfaces by the spray will flow partly into the exit opening 98 and partly into the sump well. The water falls into the well and may then drain off through the drain pipes 124, 120, but the air and that part of the water which may have vaporized is bled off through an exhaust stack 192 containing an exhaust fan (not shown) which continuously maintains a negative or low pressure in the stack relative to the surrounding atmosphere and thus causes a flow of air both from the atmosphere and from the spray 150 through the exit opening 98 and up the stack. The end chamber wall 94 is inclined or angled downwardly so that most of this air flow picks up the waste spray fluid as it leaves the mold surface. A second inclined wall or baffle 194 is provided on the other side of the exhaust duct 192 so that suction action of the exhaust stream is concentrated or directed toward the exit opening 98 rather than toward the entrance portions of the chamber. The mold parts, which are hot from the tooth biscuiting operation when placed on the entrance end of the conveyor, are of course considerably cooled by the time they reach the drying and oiling spray. However, they are normally still slightly above room temperature at this point and it is found that when the pools of water and wet surfaces thereof are subjected to the air and oil spray 150 that the water will be blown off and the mold surfaces dried and covered with a thin uniform coating of oil all at the same time, in one operation. This simultaneous drying and coating process is somewhat facilitated by the vacuum or suction action of the exhaust stack 192, which also tends to remove and vaporize the water on the molding surfaces.

Because the washing spray uses re-circulated fluid, as described above, such spray can be continuously operated without appreciable expense or waste of material for long periods of time. Consequently it is sufficient to utilize merely a conventional on-and-off switch for the motor of pump 110 and to operate such spray continuously, whether or not mold parts are passing through the machine. However, the rinsing spray and the drying and oiling spray must be supplied with new material during their operation and in order to prevent waste of such material in intervals when mold parts may not be passing through the machine micro-switches and associated circuits are provided to automatically operate these two sprays in timed relation to the passage of the mold parts along the conveyor.

Two sets of automatically actuated micro-switches are provided, as best shown in Figures 5 to 8; one set for the rinsing spray and one set for drying and oiling spray.

The rinsing spray micro-switch 200 comprises a switch box 202 fixed to the frame of the machine and containing a conventional electrical switch mechanism which controls the flow of current through the switch leads 204, 206. The switch mechanism is actuated, or opened and closed, by a flexible resilient arm 208 fixed at one end 210 to the switch box and having its free end provided with a roller 212. The roller bears on a block 214 fixed to the end of an actuating bar 216 having its opposite ends pivotally mounted in the side members of the frame. This bar carries a plate 218 positioned between two of the conveyor rollers 220, 222 projecting upwardly above the tops of the rollers and extending across substantially the full width of the conveyor so that it will be engaged by a mold part moving along the conveyor at any position laterally of the conveyor. The switch, actuating bar and plate are normally held by gravity and the elastic force of the spring lever 208 in the closed position shown in Figure 8, in which the plate 218 rests against the roller 220. When a mold part 224 moving along the conveyor reaches the position show in Figure 8 its front bottom edge 225 engages the top edge of the plate 218 and as the mold part continues to move it deflects the plate 218 into the position shown at 226, thereby partially rotating the actuating bar 216 and block 214 so as to lift lever 208 and depress plunger 228, which operates the switch in box 200, moving it to open position. While the mold part is passing its bottom surface will hold the plate 218 in the switch open position represented by the dotted lines, but just as soon as it has passed the plate 218 will move back to the full line position of Figure 8, and the switch will again be closed.

Two micro-switches, 230 and 232, are provided in the set which controls the operation of the drying and oiling spray. Micro-switch 230 is constructed and arranged like the rinsing spray micro-switch 200, except that its actuating plate 238 extends across only half the width of the conveyor and is arranged to be closed rather than opened, by passage of a mold part. Thus when a mold part passes along the upper half of the conveyor as shown in Figure 5 the plate 238 will be deflected during passage of the mold part thereover to lift the plunger 236 as before, but the switch is so arranged that it is closed when the plunger is lifted. At other times, or when the plate 238 is not deflected, switch 230 is open. Micro-switch 232 is similarly constructed and arranged, except that its plate 234 extends over the other half of the width of the conveyor and the switch box and the block 240 on the actuating bar are tilted so that the plunger is lowered rather than raised when plate 234 is deflected by a mold part. However, the switch 232 is so arranged that it will close when the plunger drops so the end result will be the same as in the case of switch 230, i. e. both switches close when their plates 234 or 238 are deflected during passage of a mold part. Because the plates 234, 238 extend over different halves of the width of the conveyor micro-switch 230 is closed only by passage of mold parts located on its half of the conveyor and micro-switch 232 is closed only by passage of mold parts located on its half.

The pneumatic and hydraulic circuit for the drying and oiling spray is shown diagrammatically in Figure 10. Compressed air from a tank (not shown) or similar source is passed through a filter and/or air dryer 242 and from there passes through a pressure regulating valve 179 to the solenoid air valves 244, 246. The outlet side of solenoid valve 244 is connected to line 173 which feeds the two guns 142, 144 through brances 174 and the outlet side of solenoid valve 246 is connected to line 175 which feeds the other two guns 138, 140 through branches 171. Manually operated valves may be provided in each of the branch air lines leading to the individual guns, as shown. The oil supply lines 180 to the individual guns are supplied with lard oil from the bottom of reservoir 188 by a common inlet line 181. The reservoir is closed and is connected at its top to the compressed air source by a line 190, which contains an air pressure regulating valve 191. Thus the oil in the reservoir is maintained at a selected steady pressure, maintained substantially constant relative to the air pressure in line 177, by the pressure exerted thereon by compressed air introduced into the reservoir through line 190.

The conveyor drive motor and the washing spray re-circulating motor may be controlled by manually operated switches as stated above. An example of one such arrangement is shown for the re-circulating pump motor at the left in Figure 11.

The two solenoid valves 244, 246, which control the supply of compressed air to the two sets of drying and oiling spray guns, are respectively controlled by the micro-switches 230, 232 as shown in Figure 11. Each micro-switch is connected in series with the respective solenoid valve controlled thereby, across the 110 v. supply line. When either switch is closed during passage of a mold part over its actuating plate the solenoid valve in series therewith is opened, thus admitting high pressure air to the two guns of the set supplied thereby. The guns are, of course, so positioned as to effectively sweep every spot on the upper surfaces of the mold part passing therebeneath and the arrangement is such that the two sprays are turned on just before or just as the mold part enters their field of action and are turned off just as the mold part leaves their field of action. Thus all portions of the upper surfaces of the mold part are dried and oiled but practically no spray fluid is wasted.

The rinsing spray is also controlled automatically, by the micro-switch 200, but in this instance means are provided for maintaining the automatic spray control valve open for a predetermined length of time after a mold part releases the switch actuating plate 218 so as to hold the spray on during a time sufficient for a mold part to traverse its length. This is accomplished by operating the solenoid valve 250 with current supplied from a time delay circuit controlled by the micro-switch 200. The micro-switch 200 is normally closed, as shown in Figure 11, and in this position electrons may flow (every other half cycle) from the supply line 260 through the micro-switch to the cathode 262 of the electronic triode tube 264. They then pass through the tube to the anode or plate 266 and out through the plate lead 268 to the other main line 270. A relay 272 is connected in series in the plate lead and acts to pick-up or lift the movable element or armature 274 of the relay switch whenever the micro-switch is closed and current is flowing through the plate lead 268. In this picked-up position of the relay the circuit through the solenoid (by way of leads 276, 278) is broken, the solenoid valve remains closed, and no water will flow to the rinsing spray.

But when the micro-switch is opened, by passage of a mold part along the conveyor, then the current flow through plate lead 268 and relay 272 is interrupted, allowing the armature 274 to drop and close the circuit through the solenoid valve 250, admitting clean water under city main or faucet pressure to the rinsing spray. Solenoid valve 250 will remain open and rinsing water will continue to flow for a predetermined time interval following the closing of micro-switch 200 subsequent to passage of the mold part thereover, because of the provision of a time delay circuit (such as, for instance disclosed in Schneider Patent 2,171,347) associated with the control grid 280 of tube 264. This time delay circuit includes a condenser 282 shunted by a resistor 284 connected at one end to the grid 280 and at the other end to the line 260 through a variable resistor or potentiometer 286. When the micro-switch 200 opens condenser 282 is charged by grid rectification (since the grid 280 is positive with respect to the cathode 262 every other half cycle). While this charge is relatively slowly drained off by resistor 284 the amount lost by such dissipation is always replaced when the micro-switch is open. When the micro-switch is closed, grid 280 will be biased by the charge on condenser 282 so that no current, or very little current, passes through the tube and the relay will not be sufficiently energized to pick-up the armature 274. However, at a predetermined time after the closing of the micro-switch (which time may be varied by the variable resistor 286) the charge of condenser 282 is dissipated by the resistors 284, 286 to an extent sufficient to lower the bias on the grid by an amount enabling a relatively large current to pass through the tube, thereby causing the armature 274 to be picked-up or opened and causing the solenoid valve 250 to close.

In operation, as a mold part moves along the conveyor it is first mechanically and chemically scoured and cleaned by the continuously operating wash spray. It then opens the micro-switch 200 which turns on the rinse spray as the mold part enters its field of action. Though the micro-switch closes (when the mold part releases its actuating plate), while the mold part is still in the beginning portion of the rinsing section the rinsing spray remains on until the mold part completes its travel through the rinsing section, because of the action of the time delay circuit. The time delay circuit is preferably so adjusted that the rinsing spray is kept on for a time interval following the closing of switch 200 just sufficient to allow the mold part to complete its travel through the field of action of the rinsing spray. The mold part then closes one or the other of the micro-switches 230, 232 which turn on the appropriate drying and oiling sprays and keep them on during the passage of the mold part thereunder. The molds may then be removed from the conveyor and used in the usual manner for molding purposes.

It is to be understood that the invention is not limited to the specific embodiment herein illustrated and described, but may be used in other ways without departure from the spirit as defined by the following claims.

We claim:
1. A machine for automatically cleaning and oiling the molding cavities of a tooth mold and comprising means for advancing molds along a predetermined path, means for projecting a detergent fluid spray into said cavities for removing foreign matter from the surfaces thereof and means for rinsing said cavities to remove detergent fluid therefrom, spray means positioned along said path following said rinsing means, and supplies of air and oil connected to said spray means, said spray means being operable to direct a mixture of air and atomized oil under pressure into said molds simultaneously to remove rinse water therefrom and dry and coat said mold cavity surfaces with a film of oil.

2. In an apparatus for drying and oiling the wet molding surfaces of mold parts which have previously been washed and rinsed, a spray means for subjecting said surfaces as moved along a predetermined path to a spray of high velocity dry air containing partially atomized oil, said spray impinging upon said molding surfaces at an angle extending downward and rearwardly relative to the direction of movement of said mold parts, and a suction means preceding said spray means along said path for withdrawing air and water directed upon and deflected from said surfaces and facilitating the replacement thereof by an oil film formed by the oil particles in said spray.

3. Apparatus according to claim 2, including a conveyor for moving said mold parts through the field of action of said spray and control means actuated by engagement by said parts as moved along said conveyor for turning said spray on and off, respectively, as said mold part moves into and out of said field of action.

4. In a machine for cleaning mold parts, a chamber which is substantially fluid tight except for an exit opening therein, means for moving mold parts through said chamber, means within said chamber for cleaning said mold parts, means for withdrawing exhaust fluid from said chamber, and means for directing a stream of air containing a partially atomized coating liquid into said exit opening and onto the surfaces of washed mold parts passing therethrough.

5. In a mold washing machine, a conveyor comprising a plurality of closely spaced parallel rolls, a driving sprocket on one end of each of said rolls, said sprockets being staggered to form two rows of aligned sprockets with all of the sprockets of alternate rolls being positioned in one or the other of said rows, chain-belt means operable to drive said rows of sprockets, a spray apparatus for treating the surfaces of molds or mold parts passing along said conveyor, and a switch mechanism for controlling the operation of said spray apparatus and including an actuating member positioned between a pair of said rolls and projected above the top thereof for engagement with and actuation by said molds and mold parts.

EDGAR Y. SHARLIP.
ALVIN P. DUNBRACK.

References Cited in the file of this patent
UNITED STATES PATENTS

| Number | Name | Date |
|---|---|---|
| 173,795 | Jordan | Feb. 22, 1876 |
| 430,861 | Krehbiel | June 24, 1890 |
| 1,512,918 | Forsgard | Oct. 28, 1924 |
| 1,529,461 | Brogden et al. | Mar. 10, 1925 |
| 1,874,002 | Fiartz | Aug. 30, 1932 |
| 1,924,018 | Begley et al. | Aug. 22, 1933 |
| 2,012,139 | Peabody | Aug. 20, 1935 |
| 2,013,302 | Ferguson | Sept. 3, 1935 |
| 2,033,044 | McDill et al. | Mar. 3, 1936 |
| 2,250,021 | Hofer | July 22, 1941 |
| 2,356,814 | Bimmerman et al. | Aug. 29, 1944 |
| 2,356,902 | Walter | Aug. 29, 1944 |
| 2,362,926 | Porch | Nov. 14, 1944 |
| 2,410,422 | Breene et al. | Nov. 5, 1946 |
| 2,426,518 | Miller | Aug. 26, 1947 |
| 2,510,912 | Schurenberg | June 6, 1950 |